Figure 1:
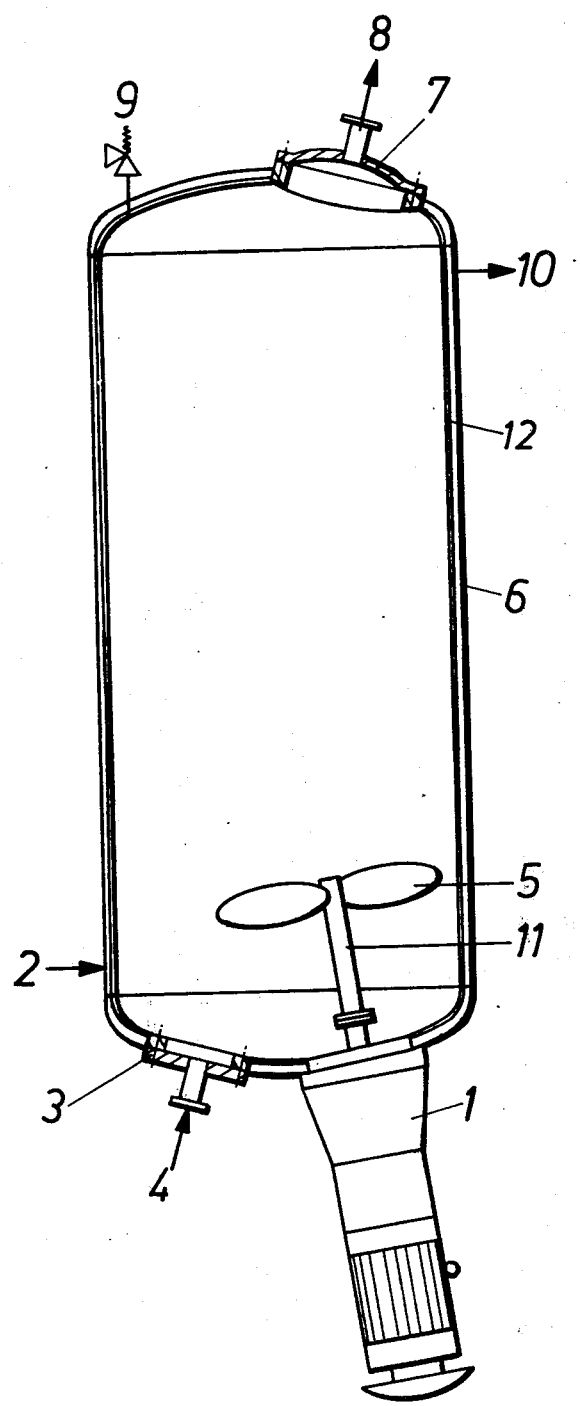

United States Patent [19]

Pettelkau et al.

[11] 4,125,697

[45] Nov. 14, 1978

[54] PROCESS FOR THE PRODUCTION OF POLYCHLOROPRENE

[75] Inventors: Hans-Jürgen Pettelkau, Burscheid; Bodo Ehrig; Karl Nöthen, both of Dormagen; Dietrich Rosahl, Munich, all of Germany

[73] Assignee: Bayer Aktiengesellschaft, Leverkusen, Germany

[21] Appl. No.: 838,294

[22] Filed: Sep. 30, 1977

Related U.S. Application Data

[63] Continuation-in-part of Ser. No. 683,473, May 5, 1976, abandoned.

[30] Foreign Application Priority Data

Nov. 5, 1976 [DE] Fed. Rep. of Germany ....... 2650714

[51] Int. Cl.² .................. C08F 2/22; C08F 114/14

[52] U.S. Cl. .................. 526/88; 526/295; 422/135; 422/138

[58] Field of Search .................. 526/88, 295

[56] References Cited

U.S. PATENT DOCUMENTS

| | | | |
|---|---|---|---|
| 2,426,854 | 9/1947 | Bare | 526/295 |
| 2,451,787 | 10/1948 | Vincent | 526/295 |
| 2,707,180 | 4/1955 | Maynard | 526/295 |
| 2,831,842 | 4/1958 | Aho | 526/295 |
| 2,837,506 | 6/1958 | Myers et al. | 526/295 |
| 3,013,000 | 12/1961 | Heinz et al. | 526/295 |

Primary Examiner—Alan Holler
Attorney, Agent, or Firm—Connolly and Hutz

[57] ABSTRACT

Object of the invention is a process for polymerizing chloroprene in aqueous emulsion in a certain apparatus which prevents formation of deposits and so-called "popcorn" polymers.

11 Claims, 2 Drawing Figures

PROCESS FOR THE PRODUCTION OF POLYCHLOROPRENE

This application is a continuation-in-part of copending commonly as signed patent application Ser. No. 683,473, filed May 5, 1976 by the same inventor, now abandoned.

The polymerisation of chloroprene in aqueous emulsion has long been known and is carried out on an industrial scale. Chloroprene polymerises spontaneously and, for this reason, is generally protected against uncontrolled and premature polymerisation by the addition of inhibitors for example, phenothiazine. If chloroprene is emulsified in water and a radical polymerisation initiator added to the resulting emulsion, the mixture polymerises very quickly.

One particularly favourable process for the polymerisation of chloroprene on a commercial scale is described in German Auslegeschrift No. 1,097,689. Chloroprene stabilised against polymerisation is used as the starting material in this process, being polymerised in alkaline emulsion in the presence of known emulsifiers and regulators with formamidine sulphinic acid as activator.

Since the polymerisation of chloroprene takes place very quickly (the polymerisation velocity of chloroprene is about 700 times higher than that of isoprene (R. E. Burk, Ind. eng. chem. 30,1054 (1938)), the heat of polymerisation is extremely difficult to dissipate. Particularly unpleasant aspects of the polymerisation of chloroprene are, on the one hand, the formation of deposits from the emulsion and, on the other hand, the formation of so-called "popcorn" polymers. Popcorn polymers are heavily crosslinked insoluble products which can be formed in addition to and in competition with the normal polymers, especially in cases where chloroprene is present in liquid or gaseous form. Once formed, popcorn polymer seeds have an autocatalytic effect so that popcorn formation proceeds very rapidly once it has started (cf. J. W. Breitenbach: "Popcorn-polymerisation" Advances in Macromolecular Chemistry, Vol. 1).

For these reasons, the continuous polymerisation of chloroprene in aqueous emulsion is particularly difficult because deposits formed from the aqueous emulsion collect on the walls of the reactor, restrict the dissipation of heat and, in addition, block the connecting pipes between the reactors. In addition, the monomer-containing deposits swell and represent a starting point for popcorn formation.

The present invention provides a process for the polymerisation of chloroprene in aqueous emulsion with radical initiators and optionally in the presence of polymerisation inhibitors, wherein polymerisation is carried out in a closed, cylindrical, vertically arranged reactor with a length-to-diameter ratio of (2–30):1 which has a smooth surface, rounded corners and no fittings is completely surrounded by a heating and cooling jacket and is equipped with one or more propeller or impeller stirrers with 2 to 5 and preferably with 3 to 4 blades having an axis of rotation which is inclined at an angle of 0° to 45° preferably 5° to 45°, more preferably 10° to 35°, especialy 15° to 30° with respect to the vertical and of which one is situated in the lower third of the reactor interior, the reactor being completely filled during polymerisation and its contents being mixed with an effective circulation volume of from 5 to 20 and preferably from 10 to 15 m$^3$/min per cubic meter of reactor volume.

In order to obtain even better admixture of the reactor contents, it can be of advantage to reverse the stirrer at regular intervals from anticlockwise to clockwise rotation and vice versa.

The polymerisation process itself is carried out in conventional manner, i.e. in an aqueous emulsion using radical initiators at temperatures in the range from about 0° to about 70° C., polymerisation generally being continued up to a conversion of from 60 to 80% (cf. for example U.S. Pat. Nos. 1,950,436; 2,227,517; 2,321,693; 2,371,719; 2,463,225; 2,481,044; 2,494,087; 2,567,117; 2,567,009; 2,831,842; 2,914,497; 2,467,769; 3,147,318; 3,147,317; GB-PS No. 1,052,581). It is essential to use the reactor described in detail in the following:

The reactor is closed, cylindrical and vertically arranged; volume 0.5–30 m$^3$, with a length-to-diameter ratio of (2–30):1, with a smooth surface, rounded corners and no fittings (for example baffles), completely surrounded by a heating and cooling jacket and provided in its lower or (and) upper third on the reactor axis with propeller stirrers comprising 2 to 5 blades having an axis of rotation inclined at an angle to the vertical of from 0° to 45° preferably 5° to 45°, more preferably 10° to 35°, especially 15° to 30° with respect to the vertical. The reactor is completely filled during polymerisation; its contents are completely mixed with an effective circulation volume adapted to the volume of the reactor: "effective circulation volume": 5–20 m$^3$/min. per cubic meter of reactor volume, preferably about 10 to 15 m$^3$/min. per cubic meter of reactor volume.

The "effective circulation volume" is defined as throughflow through the propeller circuit per unit of time.

In reactors with a large length-to-diameter ratio (i.e. large surface-to-volume ratio; advantageous for dissipating the heat of polymerisation) it is also possible to arrange one propeller stirrer in the lower third and another in the upper third of the reactor, or to arrange several propellers on one shaft in order uniformly to cover all the zones of the reaction vessel.

FIG. 1 is a section through a suitable reactor. In FIG. 1, the reference 1 denotes the stirrer drive, the reference 2 denotes the inlet for cooling liquid, the reference 3 denotes a cleaning opening, the reference 4 denotes the vessel inlet, the reference 5 denotes a propeller stirrer, the reference 6 denotes the cooling jacket, the reference 7 denotes a cleaning opening, the reference 8 denotes the vessel outlet, the reference 9 denotes a safety valve and the reference 10 denotes the outlet for the cooling liquid.

Figure 2:
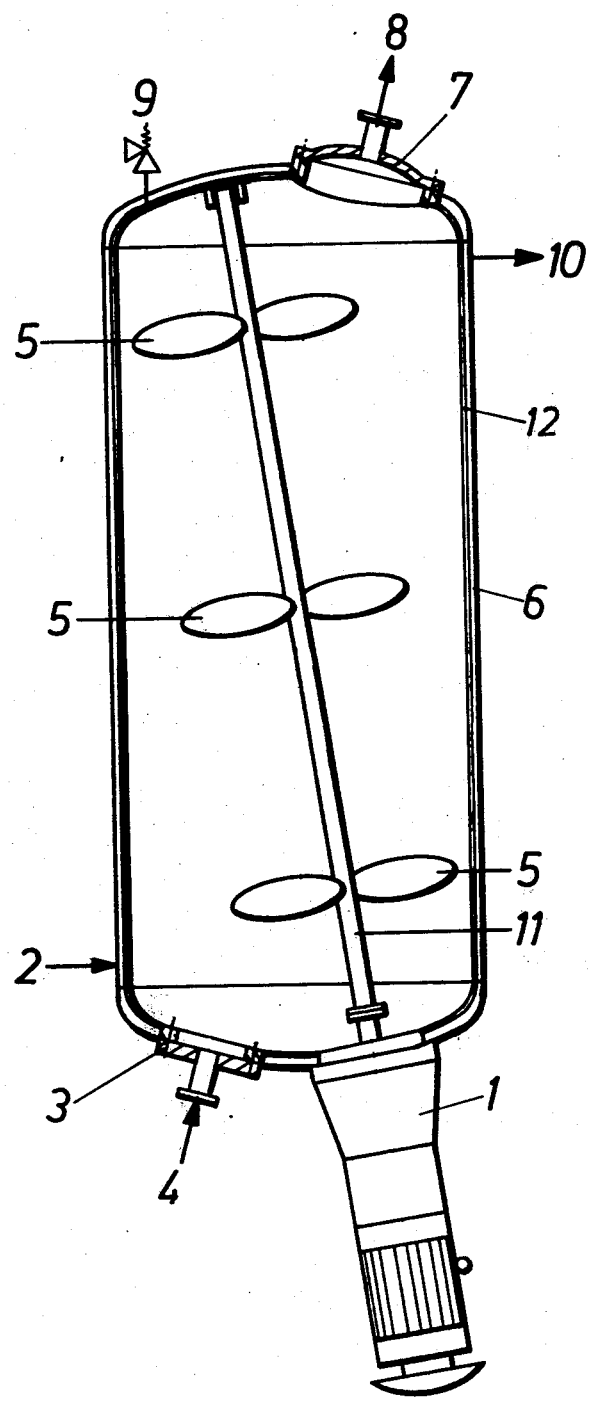

FIG. 2 illustrates a modification with a longer stirrer shaft 11 and several propeller stirrers 5.

Where this reactor is used, polymerisation may be carried out in batches. In batch operation, polymerisation is continued until the required conversion has been reached.

It is also possible and preferred to arrange several, for example 3 to 6 reactors, in series and to carry out polymerisation continuously in the reactor cascade thus formed. In this case, the first reactor is filled continuously from below, the polymerised reaction mixture is removed at the upper end, introduced into the next reactor from below and so on until it has passed through all the reactors of the cascade.

More specifically, the process may be carried out as follows:

The aqueous, organic and activator phases (for example formamidine sulphinic acid) are introduced from below into the coolable, nitrogen-purged first reactor of a reactor cascade. After heating to the reaction temperature, the polymerisation reaction begins, as reflected in an increase in temperature.

The heat of polymerisation has to be dissipated by cooling (for example with brine or water). Accordingly, each reactor is equipped with an independent cooling and heating circuit.

In cases where the cascade consists, for example, of 6 reactors, activator may be added, for example, in the first, third and fourth reactors. If necessary, a polymerisation inhibitor (for example p-tert.-butyl pyrocatechol, dissolved in aqueous sodium hydroxide) may be added to the second reactor in order to slow down an over vigorous reaction.

The conversion in the individual reactors may be controlled through the quantities of activator introduced into the individual reactors in conjunction with the throughput (quantity of monomer introduced per unit of time).

The conversion may be determined by measuring the density of the emulsion or by determining the solids content of the latex.

After leaving the last reactor, polymerisation is stopped by removing the unreacted monomer ("degassing of the latex").

The limiting factor so far as the potential throughput is concerned is the dissipation of the heat of polymerisation in the reactors. For example, a reactor cascade may consist of 5 reactors, reactor volume approximately 6 cubic meters, length-to-diameter ratio 5:1, equipped with propeller stirrers 1 meter in diameter with 3 blades, pitch angle of the propeller blades 30°, angle of the propeller axis with respect to the vertical 15°, speed of rotation; 160 rpm, effective circulation volume approximately 75 m³/min; height of propeller above reactor base: 0.7 m; constituent material of the reactor wall and propeller: chemically inert materials, for example stainless steel, Teflon enamel, etc.

With a throughput of approximately 5000 liters of chloroprene per hour, the polymerisation cascade may be operated continuously for several months without any need for general cleaning.

This procedure almost completely eliminates popcorn formation and the formation of deposits from the polymerising emulsion. Accordingly, the process may be operated continuously over a long period without any need for intermediate cleaning.

In carrying out the process, it is important above all to ensure that the reactor or reactors is/are always completely filled and that its/their contents are adequately mixed. This is guaranteed by a recirculation output of the propeller stirrer of from 5 to 20 m³/min. per cubic meter of reactor volume.

EXAMPLE

The aqueous phase (W) and the monomer phase (M) maintained in a constant ratio through a measuring and regulating system, and the activator phase (A), are introduced into the first reactor of a polymerisation cascade consisting of 5 identical reactors.

Specification of the reactors used:
volume: approximately 5 cubic meters; temperature sensors at the bottom of the reactors;
L/D-ratio: approximately 3:1
1 propeller stirrer (at the bottom of the reactor) with 3 blades propeller diameter: ~ 1 meter pitch angle of the propeller blades: 30° angle of the propeller axis with respect to the vertical:
15° height of the propeller above the base: approximately 0.7 m rotational speed: ~ 160 rpm effective circulation volume: approximately 75 m³/min constituent material of the reactor wall and the propeller: V4A steel
connecting pipes between the reactors: V4A steel, nominal width: 65 mm Composition of the three phases (as described in DT-OS No. 2,241,394, Example 2):

| (M) = Monomer phase: | | |
|---|---|---|
| chloroprene | 95.0 | parts by weight |
| 2,3-dichloro-1,3-butadiene | 5.0 | parts by weight |
| n-dodecyl mercaptan | 0.3 | part by weight |
| phenothiazine | 0.015 | part by weight |

| (W) = Aqueous phase: | | |
|---|---|---|
| deionised water | 120.0 | parts by weight |
| sodium salt of a disproportionated abietic acid | 3.5 | parts by weight |
| sodium salt of a condensation product of naphthalene sulphonic acid and formaldehyde | 0.65 | part by weight |
| caustic soda | 0.65 | part by weight |
| tetrasodium pyrophosphate | 0.5 | part by weight |

(A) = Activator phase

1% aqueous formamidine sulphinic acid solution

The three phases are combined immediately before entering the first reactor. The reaction begins gently when the emulsion is heated to approximately 40° C., as reflected in an increase in the internal temperature of the reactor to the required level of 43° C. The heat of polymerisation evolved is dissipated by cooling.

After a residue time determined by the monomer throughput, the reaction mixture flows continuously from below into the second reactor and from there into the third reactor, etc. After the fifth reactor, the latex is freed from residual monomer after the required conversion of approximately 65% has been reached.

In continuous operation, it is desirable to distribute the conversion as uniformly as possible among the reactors. To this end, 1% aqueous formamidine sulphinic acid solution may be introduced into the first, third and fourth reactors. The conversion required in each reactor may be controlled through the quantity of activator solution introduced. In the second reactor, over-rapid polymerisation may be slowed down by the introduction of an aqueous alkaline solution of p-tert.-butyl pyrocatechol (1.0% by weight in 0.5 n NaOH).

The throughput of monomer through the polymerisation cascade is limited inter alia by the maximum dissipation of heat from the reactors. With a monomer throughput of 5000 l/h, the polymerisation cascade may be operated continuously for several months without any need for intermediate cleaning.

We claim:
1. A process for the heatemitting polymerisation of chloroprene in aqueous emulsion by means of a radical initiator wherein polymerisation is carried out in a closed, cylindrical, vertically arranged reactor with a length-to-diameter ratio of (2–30):1, a smooth interior surface, rounded corners, which is substantially surrounded by a heat exchange jacket and which is equipped with at least one propeller stirring means having an axis of rotation inclined at an angle of from 0 to 45° C. with respect to the vertical, the reactor being substantially completely filled during polymerisation and its contents being circulated by the propeller stirring means with an effective circulation volume of from 5 to 20 m³/min. per cubic meter of reactor volume at a relatively low speed of rotation whereby shearing and coagulation of the aqueous emulsion are avoided, the absorption of heat of polymerisation by the heat exchange jacket is promoted and popcorn polymerisation is prevented.

2. A process as claimed in claim 1, wherein the reactor has an effective circulation volume of from 10 to 15 m³/min per cubic meter of reactor volume.

3. A process as claimed in claim 1 wherein the at least one stirring means is a propeller stirrer having 2 to 5 blades mounted on a shaft.

4. A process as claimed in claim 1, wherein one or more of the propeller stirring means is reversible from clockwise to anticlockwise direction and vise-versa and the propeller stirring means is reversed at substantially regular intervals of time.

5. A process as claimed in claim 1, wherein polymerisation is carried out in the presence of one or more polymerisation inhibitors.

6. A process as claimed in claim 1, wherein the axis of rotation of the propeller stirring means of the reactor has an angle of inclination of 5° to 45°.

7. A process as claimed in claim 1, wherein the propeller stirring means of the reactor has an angle of inclination of 10° to 35°.

8. A process as claimed in claim 1, wherein the axis of rotation of the propeller stirring means of the reactor has an angle of inclination of 15° to 30°.

9. A process for the heat-emitting polymerisation of chloroprene in aqueous emulsion by means of a radical initiator comprising the steps of performing the polymerisation contained in a closed cylindrical reactor having a length to diameter ratio of from about (2–30):1, the reactor having smooth interior surfaces with rounded corners to facilitate smooth circulatory flow within it, the reactor being substantially completely surrounded by a heat exchange jacket to permit effective absorption of polymerisation heat from the reactor, smoothly stirring the contents of the reactor in a circulatory flow at an effective circulation volume of from about 5 to 20m³/min. per cubic meter of reactor volume by rotating a propeller stirrer in the reactor of a relatively low speed whereby shearing and coagulation of the aqueous emulsion are avoided, heat is efficiently absorbed from the reactor and popcorn polymerisation is prevented.

10. A process as set forth in claim 1, wherein the at least one propeller stirring means is situated in the lower third of the interior of the reactor.

11. A process as set forth in claim 9, wherein the at least one propeller stirring means is situated in the lower third of the interior of the reactor.

* * * * *